(12) United States Patent
Whitney et al.

(10) Patent No.: US 8,392,370 B1
(45) Date of Patent: Mar. 5, 2013

(54) MANAGING DATA ON DATA STORAGE SYSTEMS

(75) Inventors: William Whitney, Marlborough, MA (US); Uday K. Gupta, Westford, MA (US); Michael B. Evans, Upton, MA (US); Gerald E. Cotter, Hopkinton, MA (US)

(73) Assignee: EMC Corporation, Hopkinton, MA (US)

(*) Notice: Subject to any disclaimer, the term of this patent is extended or adjusted under 35 U.S.C. 154(b) by 361 days.

(21) Appl. No.: 12/058,240

(22) Filed: Mar. 28, 2008

(51) Int. Cl.
*G06F 7/00* (2006.01)
*G06F 13/28* (2006.01)

(52) U.S. Cl. .......................... 707/640; 711/162
(58) Field of Classification Search .................. None
See application file for complete search history.

(56) References Cited

U.S. PATENT DOCUMENTS

| | | | |
|---|---|---|---|
| 7,293,133 B1 * | 11/2007 | Colgrove et al. | 711/111 |
| 7,490,207 B2 * | 2/2009 | Amarendran et al. | 711/165 |
| 2004/0030696 A1 * | 2/2004 | Lechner | 707/7 |
| 2004/0194055 A1 * | 9/2004 | Galloway et al. | 717/101 |
| 2005/0226059 A1 * | 10/2005 | Kavuri et al. | 365/189.05 |
| 2007/0083575 A1 * | 4/2007 | Leung et al. | 707/205 |
| 2007/0208788 A1 * | 9/2007 | Chakravarty et al. | 707/204 |
| 2008/0034259 A1 * | 2/2008 | Ko et al. | 714/718 |
| 2008/0104343 A1 * | 5/2008 | Miyagaki et al. | 711/158 |
| 2008/0288560 A1 * | 11/2008 | Kaji et al. | 707/204 |
| 2009/0063556 A1 * | 3/2009 | Nemoto et al. | 707/103 R |
| 2009/0144732 A1 * | 6/2009 | Tanaka | 718/1 |

* cited by examiner

*Primary Examiner* — Tarek Chbouki
(74) *Attorney, Agent, or Firm* — Krishnendu Gupta; Jason A. Reyes; Deepika Bhayana

(57) ABSTRACT

A method is used in managing data on data storage systems. Rules are defined for candidate data unit selection. The rules are automatically executed on a primary data storage system to examine data units on the primary data storage system. The rules are applied to the data units. A data unit is identified that matches the rules and the identified data unit is migrated. The identified data unit is copied from the primary storage system to a secondary storage system. The identified data unit on the primary storage system is replaced with metadata. the data storage space in the primary storage system corresponding to the identified data unit is freed up.

18 Claims, 8 Drawing Sheets

DATA UNITS

FREQUENTLY ACCESSED

SELDOM ACCESSED

MANAGING DATA ON DATA STORAGE SYSTEMS

FIELD OF THE INVENTION

The present invention relates to managing data on data storage systems.

BACKGROUND OF THE INVENTION

A continuing challenge in computer systems has been handling the growing amount of information or data available. Data that cannot be kept in the computer's main memory has typically been saved and stored on secondary memory, usually random access disk storage systems.

The sheer amount of information being stored on disks or other media in some form has been increasing dramatically over time. While files and disks were measured in thousands of bytes a few decades ago, then millions of bytes (megabytes), followed by billions of bytes (gigabytes), now sets of data of a million megabytes (terabytes) and even billions of megabytes (petabytes) are being created and used.

At the same time, a rule of thumb based on the Pareto principal tends to apply, leading to much waste and inefficiency. Often referred to as the 80/20 rule, the principal as applied is that it is likely that only 20% of a set of data is accessed 80% of the time. The remaining 80% of the data is accessed much less frequently, if at all. As the size of a set of data continues to grow, keeping the rarely accessed portion of it online in disk storage connected to a computer system can be an increasingly costly and wasteful strategy.

One solution for handling unused or low use individual files is archiving, or moving the entire file to another area. As a file is no longer used, archiving moves it in its entirety to a less expensive, tertiary storage medium, such as magnetic tape or optical media. However, archiving is usually not a suitable approach for many applications; for example, databases are usually composed of multiple files that are interconnected by referential integrity constraints and access methods, such as B-trees's and hash tables. Archiving some database files can break these relationships rendering an invalid view of the data.

Another approach to improve space usage includes backups that allow the set of data to be moved in its entirety to a less expensive medium, so that the disk space can be used for other tasks. However, such backups are very time consuming. With sets of data of multiple gigabyte, terabyte, and petabyte sizes, backups can take hours or even days to accomplish, in some situations. Restoring can take even longer.

Hierarchical storage management (HSM) systems as described below have been used to migrate the contents of infrequently accessed files to tertiary storage. Migration, as the term implies, moves the data to tertiary storage but also keeps track of it so that if it is requested later, it can be brought back into secondary storage.

From the application side, the storage needs of present-day applications have widely varying characteristics. For example, in a database facility, a database application might require high-speed storage to store log files (e.g., redo log files), while the database tables might be adequately stored in lower-speed storage. A tiered storage system provides storage volumes having different operational characteristics. Tiered storage systems gives the user (or system administrator) access to a range of performance capability and storage capacity to customize the storage needs for an application. Thus, in the database example, log files might be assigned to a storage volume having high-speed access characteristics. The database tables might be assigned for storage in a lower-tiered storage volume. Tiered storage is especially suitable for managing the cost of storage, by providing flexibility in balancing the changing needs between high speed (expensive) storage and lower performance (low cost) storage in an enterprise.

Data migration must be performed occasionally when the storage capacity of a volume is reached. This involves moving data from the original storage volume to a new storage volume. In a tiered storage system, it might be desirable to maintain the relative tier relationship among the storage volumes associated with an application. High capacity storage systems are increasingly in demand. It is not uncommon that a storage system contains hundreds to several thousands of physical storage devices. Managing such large numbers of physical devices in a tiered storage configuration to effect data migration, where there might be dozens to hundreds of devices at each of a number of tier levels can be a daunting task.

Different applications using a single data storage system may have different performance and/or availability requirements for the associated storage. Each application, typically run on a host, may have different capacity, performance, and/or availability requirements for storage allocated to it on the data storage system. A data storage system, which may include one or more arrays of data storage devices, generally does not receive performance and/or availability requirements for individual host applications using its storage devices.

Data storage systems may run programs, or tools, to "optimize" storage within the array. One such optimization tool is the SYMMETRIX OPTIMIZER tool, available from EMC Corporation of Hopkinton, Mass. This tool measures the usage of specific components of a SYMMETRIX storage system, also available from EMC Corp. The tool seeks to identify highly utilized components of the storage system so that the load on components within the storage system can be balanced. For example, the tool may measure the number of I/O requests handled by each physical device, or spindle, within the data storage system per unit of time. The tool uses such measurements to make decisions regarding how storage should be allocated or configured. The program may be invoked manually to migrate data to other physical devices on the storage system in an effort to optimize overall system performance. For example, when one component is highly utilized, the tool may be used to move selected data from that component to another component that is less utilized. To maintain the integrity of the storage for the application, the storage characteristics of the target component—including capacity, performance, availability, and RAID level—must match or exceed the storage characteristics of the source component.

The AutoRAID tool, available from Hewlett Packard, is another tool that can be used to optimize storage within a data storage system. The AutoRAID tool can change the RAID level of devices in the data storage system to improve the performance of the data storage system.

Data storage systems may also run tools that monitor the quality of service of the data storage system and make adjustments to maintain the specified level of service. These tools attempt to maintain the quality of service by managing the priority of operations in the data storage system and I/O requests from hosts using the system.

Conventional backups of file systems may take a considerable amount of time and backup media. In many file systems, a significant portion of the data (e.g., files) is not changed after creation or an initial period of access. The data that are backed up in a full backup are typically the same data that were backed up in the last full backup or even on earlier full backups.

The conventional mechanism to back up data is to periodically perform a full backup of everything in the file system, for example once a week or once a month, and to perform incremental backups between full backups, for example every day. A typical backup pattern uses a conventional backup mechanism. Using the conventional mechanism, full backups are performed periodically, and each full backup makes a copy of 100% of the data in the file system, even though a large percentage (e.g., 90%) of that data may not have changed since the previous full backup. Therefore, using the conventional backup mechanism, data for which one or more copies may exist on previous full backups are backed up on each current full backup.

To perform a restore from conventional backups, a current full backup is typically restored, and then any changed data are restored from the incremental backups. Typically, the file system cannot be brought back online and made operational until all the data have been restored.

HSM systems may be installed in some file systems and may be invoked manually to move file data from (expensive) online storage to (cheaper) offline media—typically, but not necessarily, tape. The file metadata (inode, directory entry) is left online to provide transparency for applications using the file system. Typically, only when an application attempts to use data that has been moved offline will the HSM copy the data back to disk.

An HSM system and a conventional backup mechanism may be used together to reduce the time and media needed to make backup copies. The HSM system may sweep through a file system looking for "old" data—data that have not changed recently. The HSM system may be invoked manually to make copies of the data in HSM-specific pools or volumes. Once the required HSM copies have been made, the file is called "migrated". The backup mechanism, if it is able to recognize data that has been migrated by the HSM file system, may not back up the data for a migrated file—only metadata (e.g., the directory entry and inode metadata) may be backed up. For example, when 80% of the data in a file system is old (unchanging), eventually all of that data will have been migrated by HSM. Then, a typical full backup of the file system will copy only 20% if the data, and all of the file system metadata.

Thus, HSM may be used to identify unchanging data and make backup copies of that data to special pools not used by the conventional full and incremental backup processes. Note that the benefit of HSM to conventional backups may be realized regardless of whether the customer actually uses HSM to remove some of the data from the file system. The benefit may be realized even if the data is left online.

A file may have other descriptive and referential information, i.e., other file metadata, associated with it. This information may be relative to the source, content, generation date and place, ownership or copyright notice, central storage location, conditions to use, related documentation, applications associated with the file or services.

Today there are different approaches for implementing the association of a file with metadata of that file. Basically, metadata of a file can be encoded onto the same filename of the file, they can be prepended or appended onto the file as part of a file wrapper structure, they can be embedded at a well-defined convenient point elsewhere within the file, or they can be created as an entirely separate file.

SUMMARY OF THE INVENTION

A method is used in managing data on data storage systems. Rules are defined for candidate data unit selection. The rules are automatically executed on a primary data storage system to examine data units on the primary data storage system. The rules are applied to the data units. A data unit is identified that matches the rules and the identified data unit is migrated. The identified data unit is copied from the primary storage system to a secondary storage system. The identified data unit on the primary storage system is replaced with metadata. the data storage space in the primary storage system corresponding to the identified data unit is freed up.

BRIEF DESCRIPTION OF THE DRAWINGS

Additional features and advantages of the invention will be described below with reference to the drawings, in which.

Figure 1:
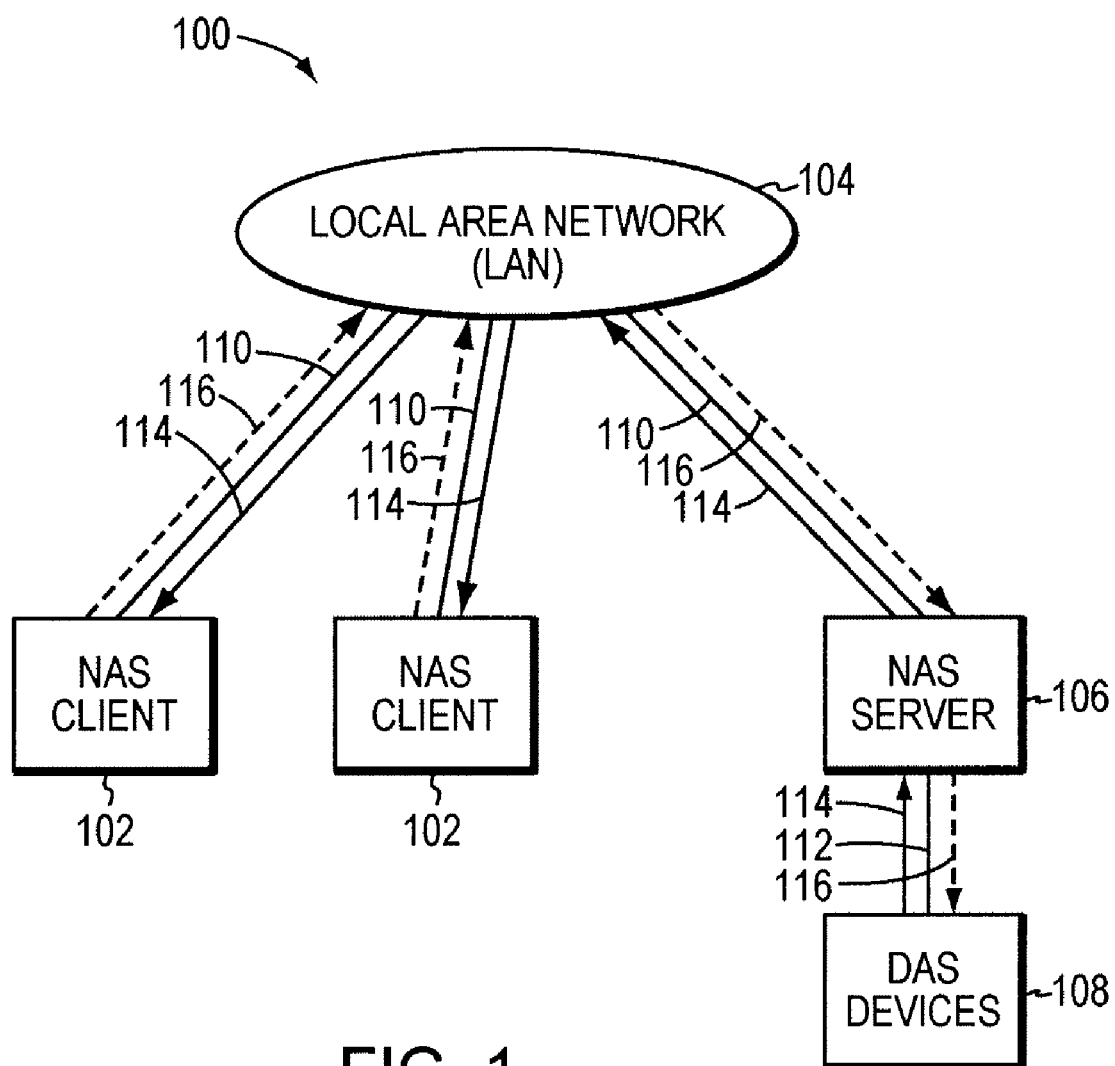
FIGS. 1-3 are illustrations of data storage environments.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

Described below is a data storage management technique according to which a policy engine automatically identifies candidate data units (e.g., files, blocks, or objects) and such data units are moved to a repository (e.g., a secondary storage system) to help improve data storage performance under the 80/20 rule.

At least one implementation of the data storage management technique relies on the following data storage and file system principles, now described.

File Systems: The term "file system" refers to the system designed to provide computer application programs with access to data stored on storage devices in a logical, coherent way. File systems hide the details of how data is stored on storage devices from application programs. For instance, storage devices are generally block addressable, in that data is addressed with the smallest granularity of one block; multiple, contiguous blocks form an extent. The size of the particular block, typically 512 bytes in length, depends upon the actual devices involved. Application programs may request data from file systems byte by byte. Consequently, file systems are responsible for seamlessly mapping between application program address-space and storage device address-space.

File systems store volumes of data on storage devices. The term "volume" refers to the collection of data blocks for one complete file system instance. These storage devices may be partitions of single physical devices or logical collections of several physical devices. Computers may have access to multiple file system volumes stored on one or more storage devices.

File systems maintain several different types of files, including regular files and directory files. Application programs store and retrieve data from regular files as contiguous, randomly accessible segments of bytes. With a byte-addressable address-space, applications may read and write data at any byte offset within a file. Applications can grow files by writing data to the end of a file; the size of the file increases by the amount of data written. Conversely, applications can truncate files by reducing the file size to any particular length. Applications are solely responsible for organizing data stored within regular files, since file systems are not aware of the content of each regular file.

Files are presented to application programs through directory files that form a tree-like hierarchy of files and subdirectories containing more files. Filenames are unique to directories but not to file system volumes. Application programs identify files by pathnames comprised of the filename and the names of all encompassing directories. The complete directory structure is called the file system namespace. For each file, file systems maintain attributes such as ownership information, access privileges, access times, and modification times.

Many file systems utilize data structures called inodes to store information specific to each file. Copies of these data structures are maintained in memory and within the storage devices. Inodes contain attribute information such as file type, ownership information, access permissions, access times, modification times, and file size. Inodes also contain lists of pointers that address data blocks. These pointers may address single data blocks or address an extent of several consecutive blocks. The addressed data blocks contain either actual data stored by the application programs or lists of pointers to other data blocks. With the information specified by these pointers, the contents of a file can be read or written by application programs. When an application programs write to files, data blocks may be allocated by the file system. Such allocation modifies the inodes.

Additionally, file systems maintain information, called "allocation tables", that indicate which data blocks are assigned to files and which are available for allocation to files. File systems modify these allocation tables during file allocation and de-allocation. Most modern file systems store allocation tables within the file system volume as bitmap fields. File systems set bits to signify blocks that are presently allocated to files and clear bits to signify blocks available for future allocation The terms real-data and metadata classify application program data and file system structure data, respectively. In other words, real-data is data that application programs store in regular files. Conversely, file systems create metadata to store volume layout information, such as inodes, pointer blocks, and allocation tables. Metadata is not directly visible to applications. Metadata requires a fraction of the amount of storage space that real-data occupies and has significant locality of reference. As a result, metadata caching drastically influences file system performance.

Metadata consistency is vital to file system integrity. Corruption of metadata may result in the complete destruction of the file system volume. Corruption of real-data may have bad consequences to users but will not affect the integrity of the whole volume.

I/O Interfaces: I/O interfaces transport data among computers and storage devices. Traditionally, interfaces fall into two categories: channels and networks. Computers generally communicate with storage devices via channel interfaces. Channels predictably transfer data with low-latency and high-bandwidth performance; however, channels typically span short distances and provide low connectivity. Performance requirements often dictate that hardware mechanisms control channel operations. The Small Computer System Interface (SCSI) is a common channel interfaces. Storage devices that are connected directly to computers are known as direct-attached storage (DAS) devices.

Computers communicate with other computers through networks. Networks are interfaces with more flexibility than channels. Software mechanisms control substantial network operations, providing networks with flexibility but large latencies and low bandwidth performance. Local area networks (LAN) connect computers medium distances, such as within buildings, whereas wide area networks (WAN) span long distances, like across campuses or even across the world. LANs normally consist of shared media networks, like Ethernet, while WANs are often point-to-point connections, like Asynchronous Transfer Mode (ATM). Transmission Control Protocol/Internet Protocol (TCP/IP) is a popular network protocol for both LANs and WANs. Because LANs and WANs utilize very similar protocols, for the purpose of this application, the term LAN is used to include both LAN and WAN interfaces.

Recent interface trends combine channel and network technologies into single interfaces capable of supporting multiple protocols. For instance, Fibre Channel (FC) is a serial interface that supports network protocols like TCP/IP as well as channel protocols such as SCSI-3. Other technologies, such as iSCSI, map the SCSI storage protocol onto TCP/IP network protocols, thus utilizing LAN infrastructures for storage transfers.

The term "storage area network (SAN)" is used to describe network interfaces that support storage protocols. Storage devices connected to SANs are referred to as SAN-attached storage devices. These storage devices are block and object-addressable and may be dedicated devices or general purpose computers serving block and object-level data.

Block and object-addressable devices connect to SANs and share storage among multiple computers. Block-address devices are common storage devices that are addressable by fixed length data blocks or sectors. In contrast, object-addressable devices are impending devices that are addressable by an object identifier and an offset into the object. Each object-addressable device may support numerous objects.

SANs are often dedicated networks specifically designed to transport block data; however, SANs may also operate as subsets of general purpose LANs and share the same physical network connections. Therefore, the type of data moving on the network dictates whether a network is a SAN or a LAN.

Local File Systems: Local file systems service file-level requests for application programs only running on the same computer that maintains the non-shared file system volume. To achieve the highest levels of performance, local file systems extensively cache metadata and real-data within operating system buffer caches and page caches. Because local file systems do not share data among multiple computer systems, performance is generally very good.

Local file systems traditionally store volumes on DAS devices connected directly to the computer. The weakness of using DAS is that should the computer fail, volumes located on the DAS devices become inaccessible. To reclaim access to these volumes, the DAS devices must be physically detached from the original computer and connected to a backup computer.

SAN technologies enable local file system volumes to be stored on SAN-attached devices. These volumes are accessible to several computers; typically, however, at any point in time, each volume is only assigned to one computer. Storing local file system volumes on SAN-attached devices rather than DAS devices has a benefit that the volumes may be easily reassigned to other computers in the event of failures or maintenance.

Distributed File Systems: Distributed file systems provide users and application programs with transparent access to files from multiple computers networked together. Distributed file systems lack the high-performance found in local file systems due to resource sharing and lack of data locality. However, the sharing capabilities of distributed file systems often compensate for poor performance.

Architectures for distributed file systems fall into two main categories: network attached storage (NAS)-based and storage area network (SAN)-based. NAS-based file sharing, also known as "shared nothing", places server computers between storage devices and client computers connected via LANs. In contrast, SAN-based file sharing, traditionally known as "shared disk" or "share storage", uses SANs to directly transfer data between storage devices and networked computers.

NAS-based Distributed File Systems: NAS-based distributed file systems transfer data between server computers and client computers across LAN connections. The server computers store volumes in units of blocks on DAS devices and present this data to client computers in a file-level format. These NAS servers communicate with NAS clients via NAS protocols. Both read and write data-paths traverse from the clients, across the LAN, to the NAS servers. In turn, the servers read from and write to the DAS devices. NAS servers may be dedicated appliances or general-purpose computers.

A common NAS protocol uses central servers and DAS devices to store real-data and metadata for the file system volume. These central servers locally maintain metadata and transport only real-data to clients. The central server design is simple yet efficient, since all metadata remains local to the server. Like local file systems, central servers only need to manage metadata consistency between main memory and DAS devices. In fact, central server distributed file systems often use local file systems to manage and store data for the file system. In this regard, the only job of the central server file system is to transport real-data between clients and servers.

Central server designs were the first NAS-based distributed file systems. As the need for greater parallelism and enhanced availability grew, distributed file system designs evolved from central servers to multiple server configurations. As with central servers, multiple servers, also known as distributed servers, store all file system data on DAS devices connected to server computers. Since multiple servers cooperatively manage the file system, servers may share metadata between computers. The complexity of these designs increases an order of magnitude, since distributed system integrity requires strong metadata consistency between servers. Such systems often cannot use local file systems to store data. As a result, server software must manage, store, and transport metadata and real-data between servers.

Distributed server file systems have further evolved into designs where clients and servers are often difficult to distinguish. In these systems, clients manage, store, and transport metadata and real-data between servers and other clients.

One aspect of NAS-based file system designs that has remained unchanged among central server, distributed server, and merged client-server designs is the direct attachment of storage devices to computers. With devices directly attached to computers, however, a single computer failure renders data stored on the storage devices inaccessible. Although redundant devices on separate computers can be added to improve availability, such techniques add complexity and cost to the system.

Furthermore, the NAS architecture limits performance when clients access data stored on remote devices, because the data-path between client and storage device includes server computers. These servers add overheads caused by server workloads as well as overheads relating to the translations from channel interface protocols to network interface protocols. Server computers designed to support large workloads are very expensive.

FIG. 1 illustrates the data-paths and components of a typical, prior art NAS-based file sharing environment 100. NAS clients 102 are connected to the NAS server 106 via network-based I/O interface links 110 connected to the LAN 104. The LAN 104 consists of network components such as routers, switches, and hubs. The NAS server 106 connects to DAS devices 108 via channel-based I/O interface links 112. The DAS devices 108 are block addressable, non-volatile storage devices. These interface links 110 and 112 include one or more physical connections.

The NAS read data-path 114 begins at the DAS devices 108 and leads to the NAS server 106. The read data-path 114 continues through the NAS server 106, across the LAN 104, to the NAS clients 102. Conversely, the NAS write data-path 116 begins at the NAS clients 102 and traverses through the LAN 104 to the NAS server 106. The NAS server 106, in turn, writes across the channel interface link 112 to the DAS devices 108.

SAN-based Distributed File Systems: Distributed file system designs that use SAN technologies have followed a different evolutionary path. Instead of storing data on storage devices connected directly to computers, SAN-based designs store data on SAN-attached devices shared among several client computers. SAN-based designs have high-bandwidth, low-latency data-paths between clients and devices.

SAN-based file systems require arbitration for the storage devices and consistency management of any data cached on the clients. Consistency mechanisms are either centrally located or distributed within the system. The consistency mechanisms may include software running on computers, hardware mechanisms attached to the networks, or a combination of both hardware and software.

There are two distinct SAN-based file system designs. The first design uses private file managers, in which client computers independently access metadata and real-data directly from the storage devices. Private file manager schemes do not require dedicated servers, since all necessary data is taken directly from the SAN-attached devices. With private file manager designs, clients only service local file requests.

As a result of their designs, clients utilizing private file managers remain independent from the failures and bottlenecks of other clients. Similarly, client resources such as memory, CPUs, and bus bandwidth are not spent servicing requests from other clients.

The second type of SAN-based distributed file system design utilizes file manager server computers. These file servers manage file system namespace and metadata. SAN clients make requests to the SAN servers, and the servers determine the location of real-data on SAN devices by examining and modifying file metadata. Once the location is determined, the servers either initiate transfers between clients and storage devices or inform the clients how to invoke the transfers. Servers must maintain and store metadata, manage real-data, and control transfers between clients and storage devices. The Celerra HighRoad multiplex file system (MPFS) from EMC Corporation is an example of a SAN-based file system that utilizes SAN server file managers to facilitate file transfers between SAN devices and SAN clients.

Figure 2:
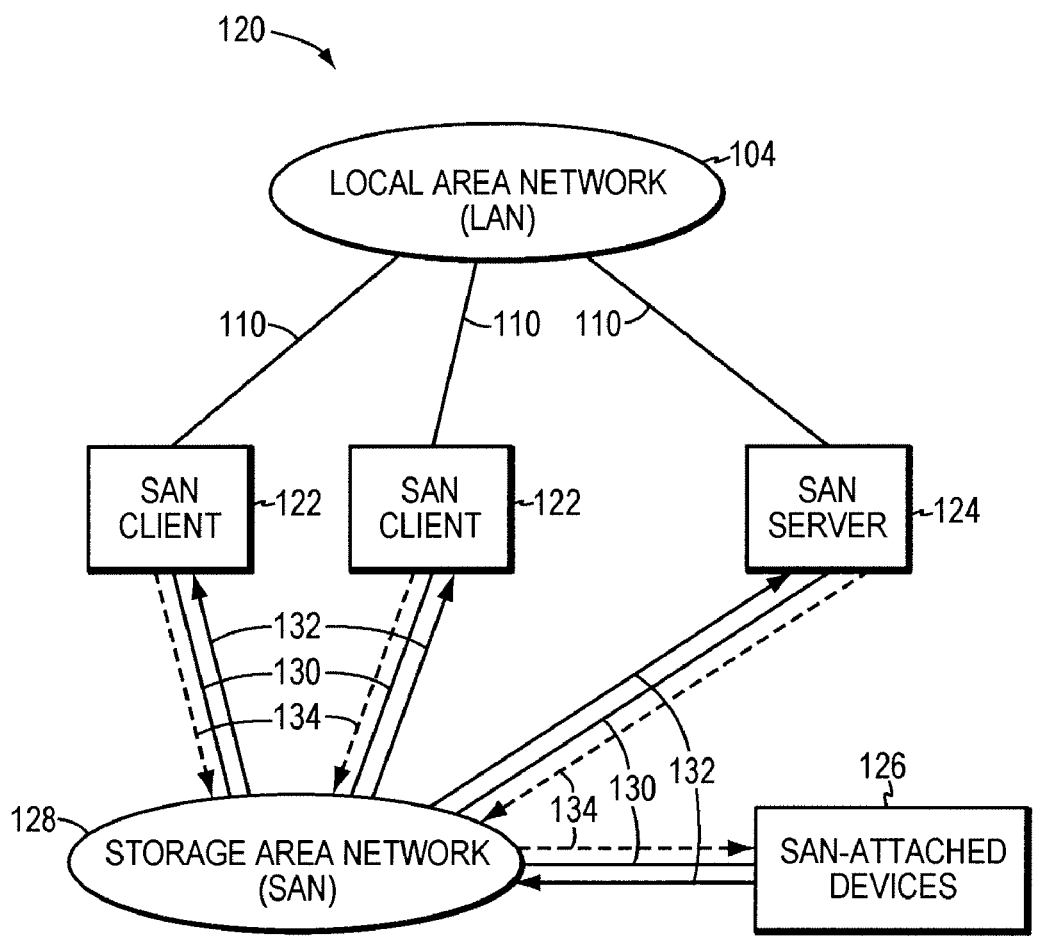

FIG. 2 illustrates the data-paths and components of a typical, prior art SAN-based file sharing environment 120. SAN clients 122 are connected to the SAN server 124 via network-based I/O interface links 110 connected to the LAN 104. The LAN 104 consists of network components such as routers, switches, and hubs. Typically only control and consistency information passes across the LAN 104. In some SAN-based file system designs, the SAN server 124 and the LAN 104 are unnecessary. In other designs, the SAN-based file system may actually utilize the services of a NAS-based file system to pass control information between the servers 124 and clients 122. Regardless of the control data-path, SAN clients 122 access all real-data via SAN protocols.

The SAN clients 122 and the SAN server 124 connect to the SAN-attached devices 126 via channel-based I/O interface links 130 capable of transferring storage protocols over network connections. As with the LAN links 110, the channel links 130 include one or more physical connections. The I/O interface 130 links connect to the SAN 128, which consists of network components such as routers, switches, and hubs. The SAN 128 may also include components that perform storage virtualization, caching, and advanced storage management functions. The SAN-attached devices 126 are typically block addressable, non-volatile storage devices. SAN-attached devices 126 may also support object-addressable interfaces. SAN-attached devices 126 often have multiple ports that connect via channel links 130 to the SAN 128.

The SAN read data-path 132 begins at the SAN devices 126, passes across the SAN 128, and leads to the SAN clients 122 and the SAN server 124. The SAN write data-path 134 begins at the SAN clients 122 and the SAN server 124 and passes through the SAN 128 to the SAN-attached devices 126.

SAN-based File Sharing using Local File Systems: Local file systems may be used in SAN file sharing environments 120 under various restrictions. For instance, most local file system volumes may be mounted by multiple SAN clients 122 as long as all clients 122 mount the volume in read-only mode. Since the volume does not change, caching performed by the clients 122 does not affect the state of the SAN environment 120. When files of the volume need to be modified, however, all clients 122 must unmount the volume and then one client 122 re-mounts the volume in read-write mode. This client 122 makes the appropriate modifications and then unmounts the volume. Finally, all clients 122 re-mount the volume in read-only mode. This scheme promotes high-speed file sharing.

Some local file systems are specifically designed to support SAN file sharing environments 120 where one SAN client 122 mounts the volume in read-write mode and all other SAN clients 122 mount the volume read-only. These SAN-based local file system must frequently flush dirty caches on the read-write client 122 and regularly invalidate stale caches on the read-only clients 122. One computer is capable of modifying the volumes.

SAN Clients that Serve NAS Clients: A SAN-based file sharing environment 120 may be configured to serve a large number of NAS client computers 102 using NAS file sharing protocols. SAN clients 122 act as NAS servers 106 that serve volumes stored on the SAN-attached devices 126 to a large number of NAS clients 102 connected to the NAS servers 106 though LANs 104. Such systems, also known as clusters, combine SAN and NAS technologies into a two tiered scheme. In effect, a NAS cluster can be viewed as a single, large NAS server 106.

SAN Appliances: SAN appliances are prior art systems that consist of a variety of components including storage devices, file servers, and network connections. SAN appliances provide block-level, and possibly file-level, access to data stored and managed by the appliance. Despite the ability to serve both block-level and file-level data, SAN appliances do not possess the needed management mechanisms to actually share data between the SAN and NAS connections. The storage devices are usually partitioned so that a portion of the available storage is available to the SAN 128 and a different portion is available for NAS file sharing. Therefore, for the purpose of this application, SAN appliances are treated as the subsystems they represent.

Figure 3:
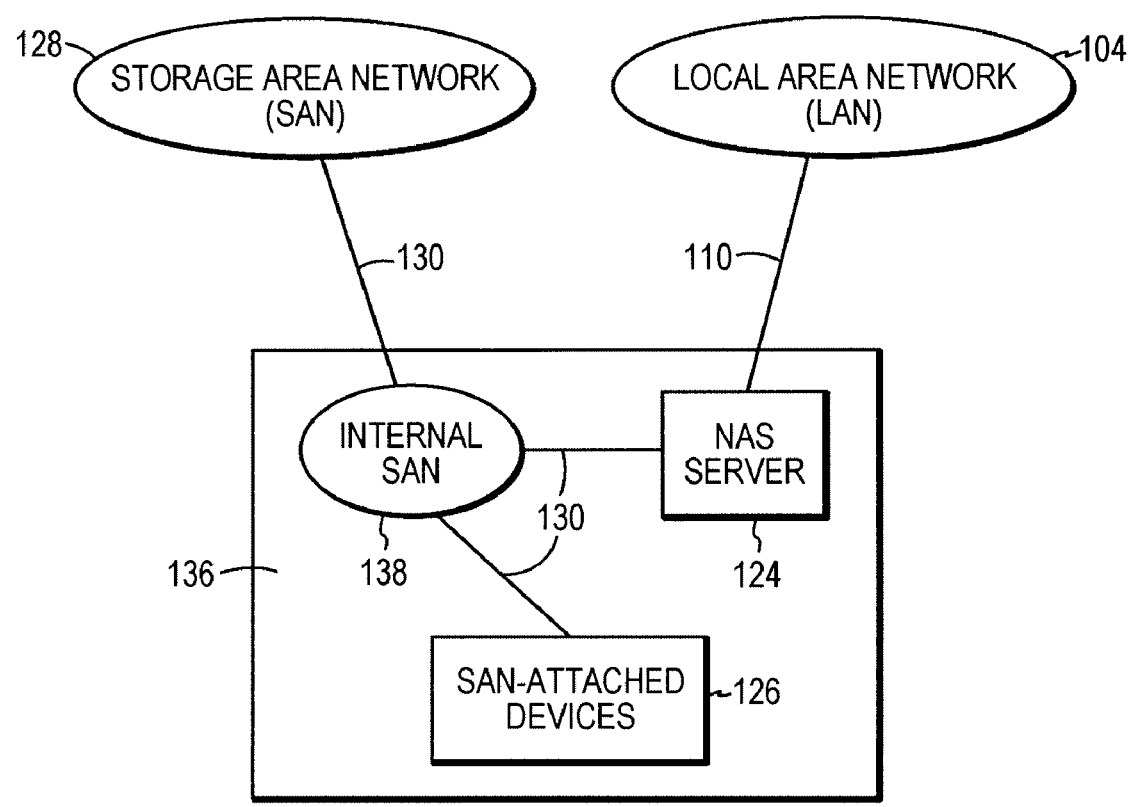

FIG. 3 illustrates an example of a SAN appliance 136 that possesses an internal SAN 138 that shares data between SAN-attached devices 126, the NAS server 124, and the SAN 128 external to the appliance 136. The appliance 136 serves block-level data, through channel-based interface links 130, to the SAN 128. From the perspective of the SAN, the appliance 136 appears as a prior art SAN-attached device 126. The appliance 136 also serves file-level data, through network-based interface links 110, to the LAN 104. From the perspective of the LAN, the appliance 136 appears as a prior art NAS server 124.

Another adaptation of a SAN appliance is simply a general purpose computer with DAS devices. This computer converts the DAS protocols into SAN protocols in order to serve block-level data to the SAN 128. The computer may also act as a NAS server 124 and serve file-level data to the LAN 104.

File System Layering: File system designers can construct complete file systems by layering, or stacking, partial designs on top of existing file systems. The new designs reuse existing services by inheriting functionality of the lower level file system software. For instance, NFS is a central-server architecture that utilizes existing local file systems to store and retrieve data from storage device attached directly to servers. By layering NFS on top of local file systems, NFS software is free from the complexities of namespace, file attribute, and storage management. NFS software consists of simple caching and transport functions. As a result, NFS benefits from performance and recovery improvements made to local file systems.

Other examples of file system layering include adding quota support to existing file system, strengthening consistency of cached data in an existing distributed file system, and adding compression or encryption to file systems without such support.

Installable File System Interfaces: Most modern operating systems include installable file system interfaces to support multiple file system types within a single computer. In UNIX, the Virtual File System (VFS) interface is an object-oriented, installable interface. While several UNIX implementations incorporate VFS, the interfaces differ slightly between platforms. Several non-UNIX operating systems, such as Microsoft Windows NT, have interfaces similar to VFS.

Many file system interfaces support layering. With layering, file systems are capable of making calls to other file systems though the virtual file system interface. For instance, NFS server software may be implemented to access local file systems through VFS. In this manner, the server software does not need to be specifically coded for any particular local file system type; new local file systems may be added to an operating system without reconfiguring NFS.

Figure 4:
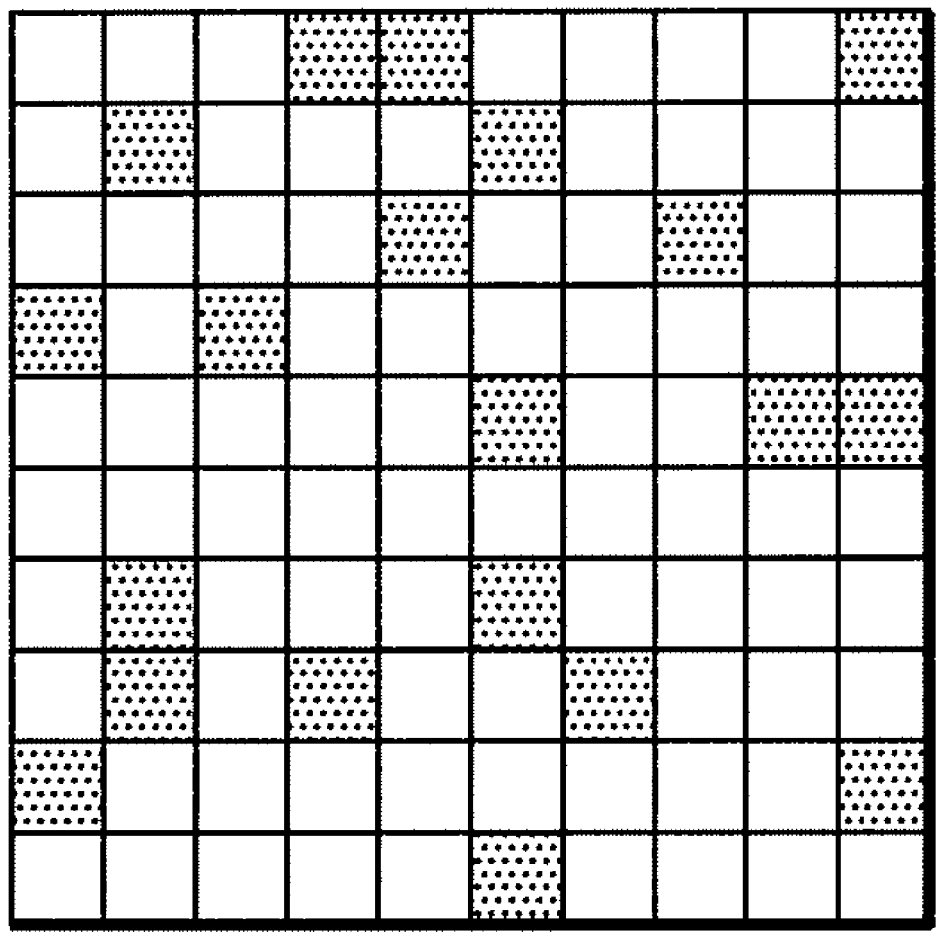
FIGS. 4-5 are illustrations of data unit distributions.
Figure 4:
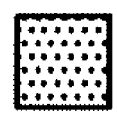
Figure 4:
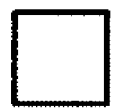
Figure 5:
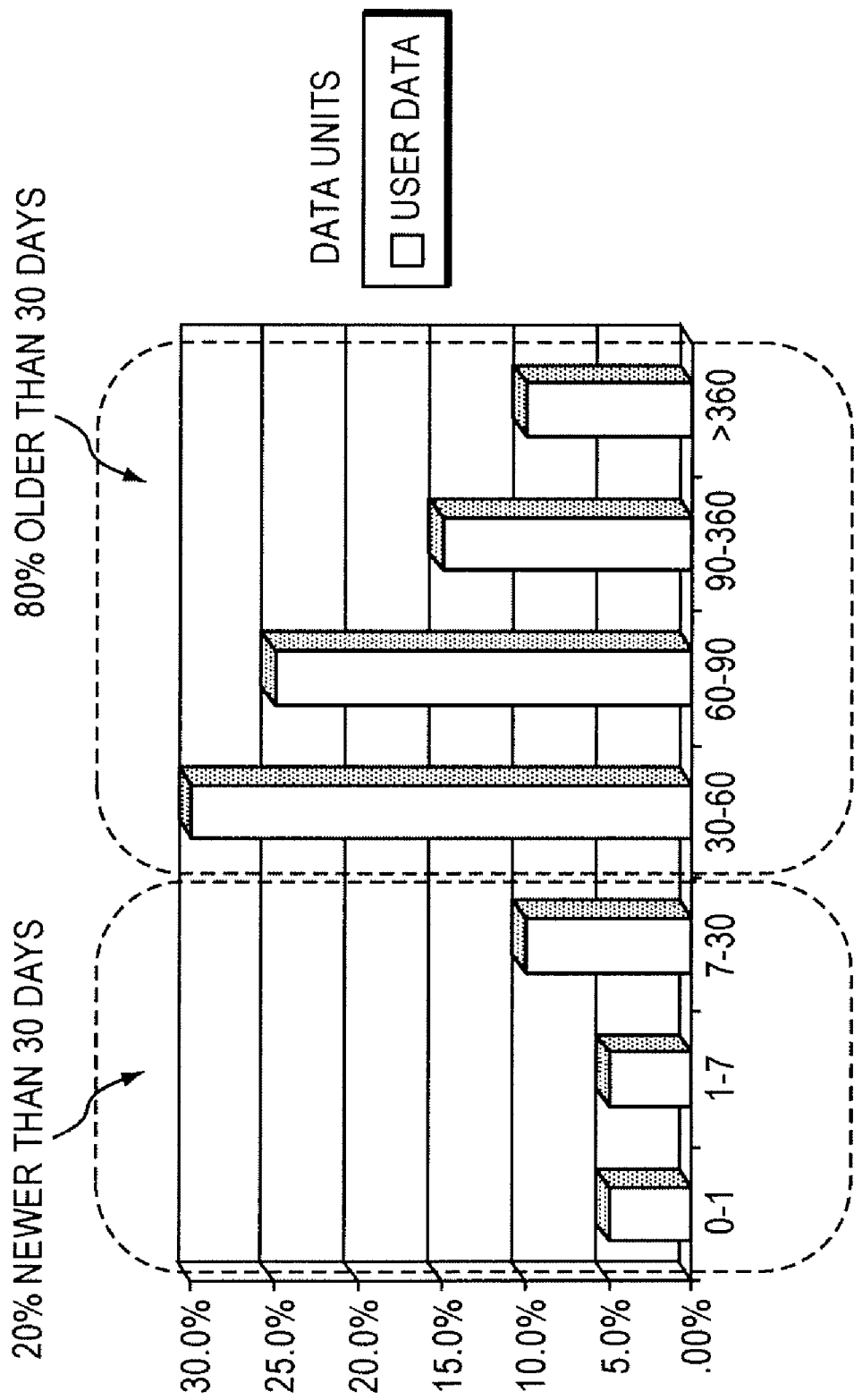

FIG. 4 illustrates that a data management system has some data units (20%) that are frequently accessed and many more data units (80%) that are seldom accessed. The latter data units may not need to be stored on expensive, high performance storage or in a form that represents its full storage utilization. FIG. 5 illustrates a sample breakdown of data units by days since last access. Regardless of where the data units are stored, they need to be maintained in their original lookup spaces (e.g., original namespaces) so that users and applications can find them.

Figure 6:
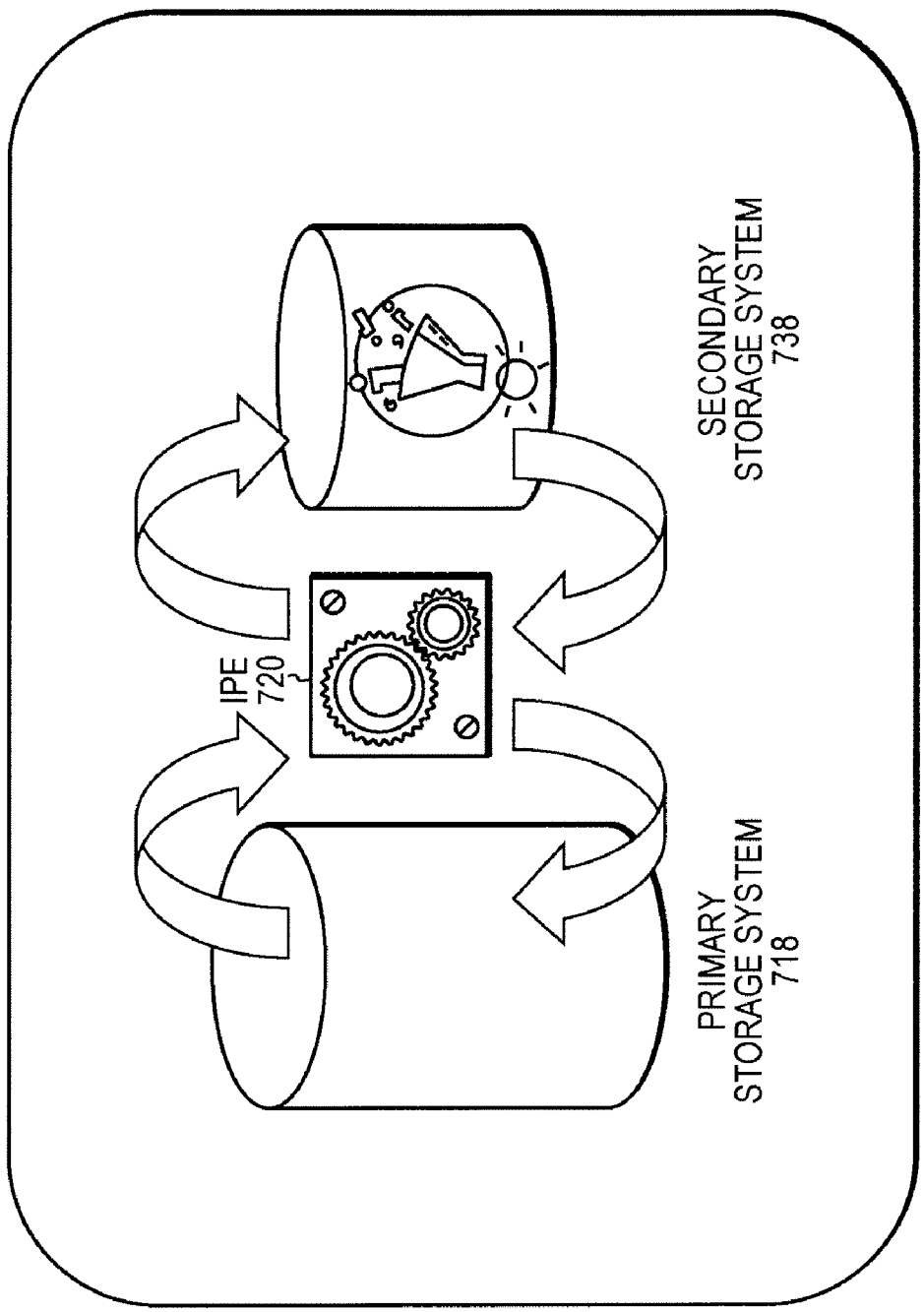
FIGS. 6-7 are block diagrams of a data management system.

In accordance with the data management technique, data is managed in a way that is completely or largely transparent to the end-user; a small impact on read performance may be experienced. FIG. 6 illustrates an example in which an Internal Policy Engine (IPE) 720 is used in the data management technique to move data units between a primary storage system 718 and a secondary storage system 738 as described in more detail below. One or both of systems 718, 738 may be or include or be included in one or more NAS or SAN systems as described above.

Figure 8:
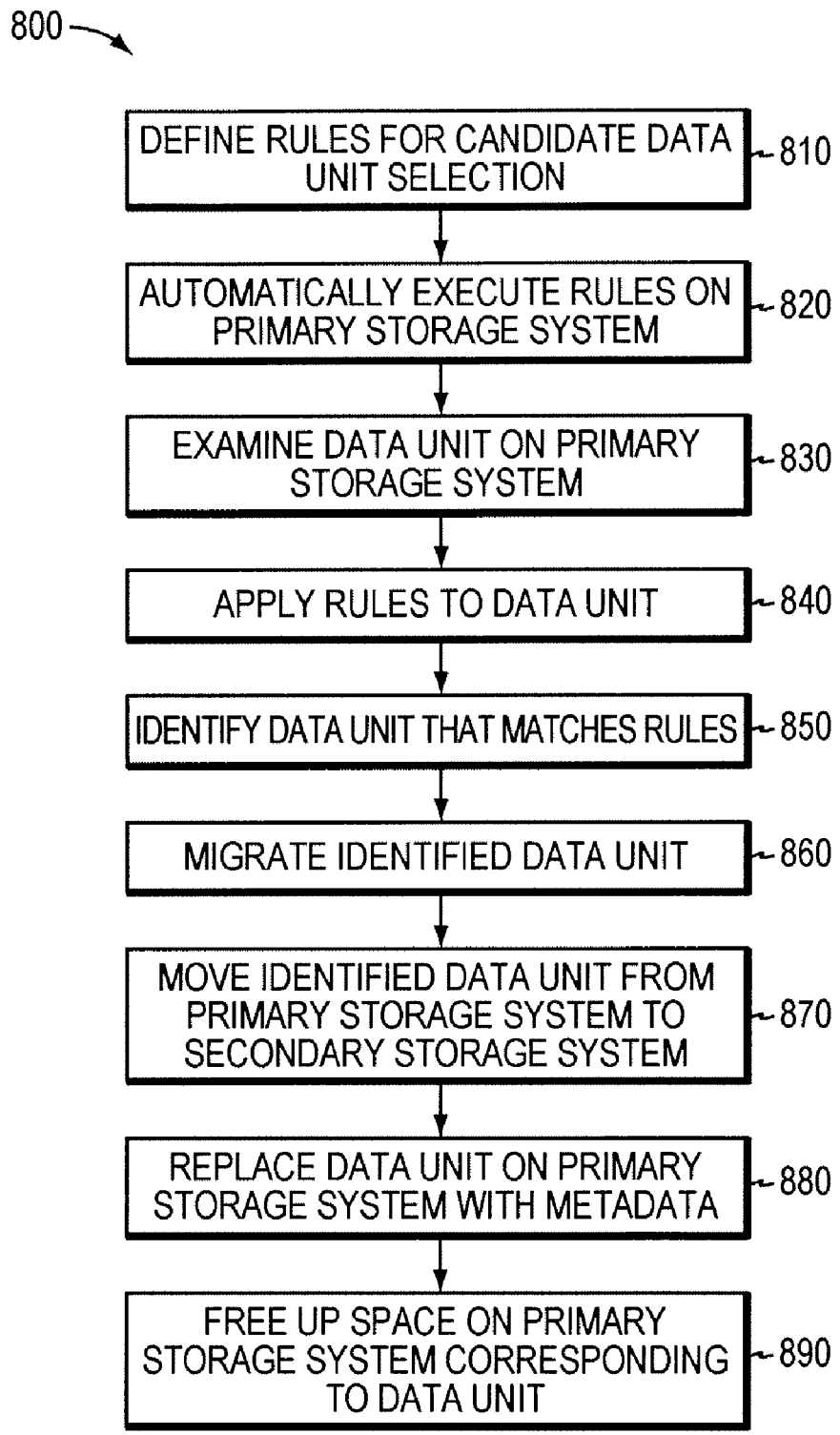
FIG. 8 is a flow diagram of a process for use with the system of FIGS. 6-7.

With reference to FIG. 8 and reference numeral 800, in at least one implementation, the IPE is used as follows. Rules are defined for candidate data unit (e.g., file, block, or object) selection (step 810), which may take into account, for example, the data unit's age, last access time, size, file type, name. The rules are automatically executed on the primary storage system 718 (e.g., having a file system as described above) (step 820) such that each data unit (e.g., file, block, or object) on system 718 is automatically examined (step 830), the rules are automatically applied to each data unit (step 840), and each data unit that matches the rules is automatically identified (step 850). The identified data units are automatically migrated (step 860) such that the data units are automatically moved from the primary storage system 718 to respective locations in the secondary storage system 738 (step 870), are automatically replaced on the primary storage system by metadata (e.g., stubs, inodes) pointing to the respective locations (step 880), and the data storage space in primary storage system 718 corresponding to the data units is automatically freed up (e.g., file blocks are returned to the file system by altering file allocation tables) (step 890).

Thus candidate data units identified by IPE 720 can be moved to optimized storage (e.g., secondary storage system 738) within the same storage domain.

At least some embodiments have one or more of the following characteristics. Read performance in the data storage system is optimized so that clients experience little or no performance impact on read back and read through operations; when a data unit (e.g., file) is written, the data unit is recalled from the secondary storage system 738. A tight linkage is provided between the primary storage system 718 and the secondary storage system 738 to maintain a consistency group for backup and checkpoints. In at least one embodiment, IPE 720 runs in the context of a file system and its execution is scheduled and transparent to end-users. Secondary storage system 738 is storage that is less costly (lower cost per megabyte) to the customer, e.g., using SAS and/or SATA hard drives, and that may also be denser (packed into a smaller space) and may use redundant data elimination (RDE) and/or data compression. Secondary storage system 738 may be locally accessible to help effects on read performance. In general, any tradeoff in performance may be mitigated by the fact that the data units are seldom if ever read back otherwise accessed.

One or more of the following characteristics may be provided in at least some embodiments. Primary storage system 718 and/or secondary storage system 738 may use semiconductor memory such as flash memory exclusively or in addition to magnetic memory such as hard disk memory. The data units that are accessed most frequently may be stored in flash memory, for fast access. The data management technique may be applied to help reduce the cost to maintain large amounts of data, by allowing less frequently accessed data to be stored on cheaper, lower performance storage mechanisms. In the case of data units serving as files, a directory listing that includes files moved as a result of the data management technique has the same appearance to the user as a conventional directory listing. Secondary storage system 738 may be or include storage that is remote from primary storage system 718, e.g., online, Internet, or cloud based storage. In the case of data units serving as blocks, storage system 718 and/or 738 may include software that creates, updates, and makes available metadata about the blocks, such as time of last access, data of creation, and/or other types of information that is typical of file metadata.

At least some embodiments have one or more of the following characteristics. Metadata about the data units may be stored in persistent memory (e.g., flash memory and/or magnetic memory) such that the data storage management technique can take such metadata into account after one or more power cycles of the data storage system. IPE 720 may be configured to process data units on a project basis so that, for example, data units belonging to a file system and data storage associated with a particular project may be moved to secondary storage system 738 automatically once the project period has completed; since the namespace of the file system is unaffected, the data storage system can service subsequent on demand needs without any manual intervention. IPE 720 may be configured to take into account the type and/or size of the data unit; for example, if the secondary storage system 738 is based on compression, IPE 720 may avoid moving uncompressible data to such system 738, and/or if the secondary storage system 738 is unsuitable for serving multimedia information, IPE 720 may avoid moving such data units to such system 738.

One or more of the following characteristics may be provided in at least some embodiments. All or part of the data management technique and/or IPE 720 may operate automatically or manually (e.g., on demand), and/or on a schedule such as during off peak hours, and/or may be throttled to help avoid excessively affecting performance. The data management technique may be applied to cause data compression and/or RDE to be applied only to the data units that are seldom accessed. Primary storage system 718 may have a driver that intervenes or is invoked, when an access attempt is made to the metadata representing a data unit that has been moved to secondary storage system 738, to cause the data unit or at least some of its contents to be retrieved from secondary storage system 738 to service the access attempt. All or part of the data management technique and/or IPE 720 may take into account long term characteristics of a set of data units, such as a set of data units that are needed only in the last month of each fiscal quarter; the set may be automatically moved from secondary storage system 738 to primary storage system 718 at the beginning of such month, and may be returned to secondary storage system 738 after the end of such month. The data management technique and/or IPE 720 may operate frequently enough that the data storage system needs no set aside period for archiving. The data management technique may be implemented at a virtualization layer of the storage system. Data units may be managed at a project, file, or block level. The data management technique may take into account file system metadata already available in conventional file systems. The data management technique and/or IPE 720 may be configured to give priority to reducing electrical power consumption, e.g., by moving appropriate data units to a secondary storage system 738 that uses little or no power when such data units are not being accessed.

Figure 7:
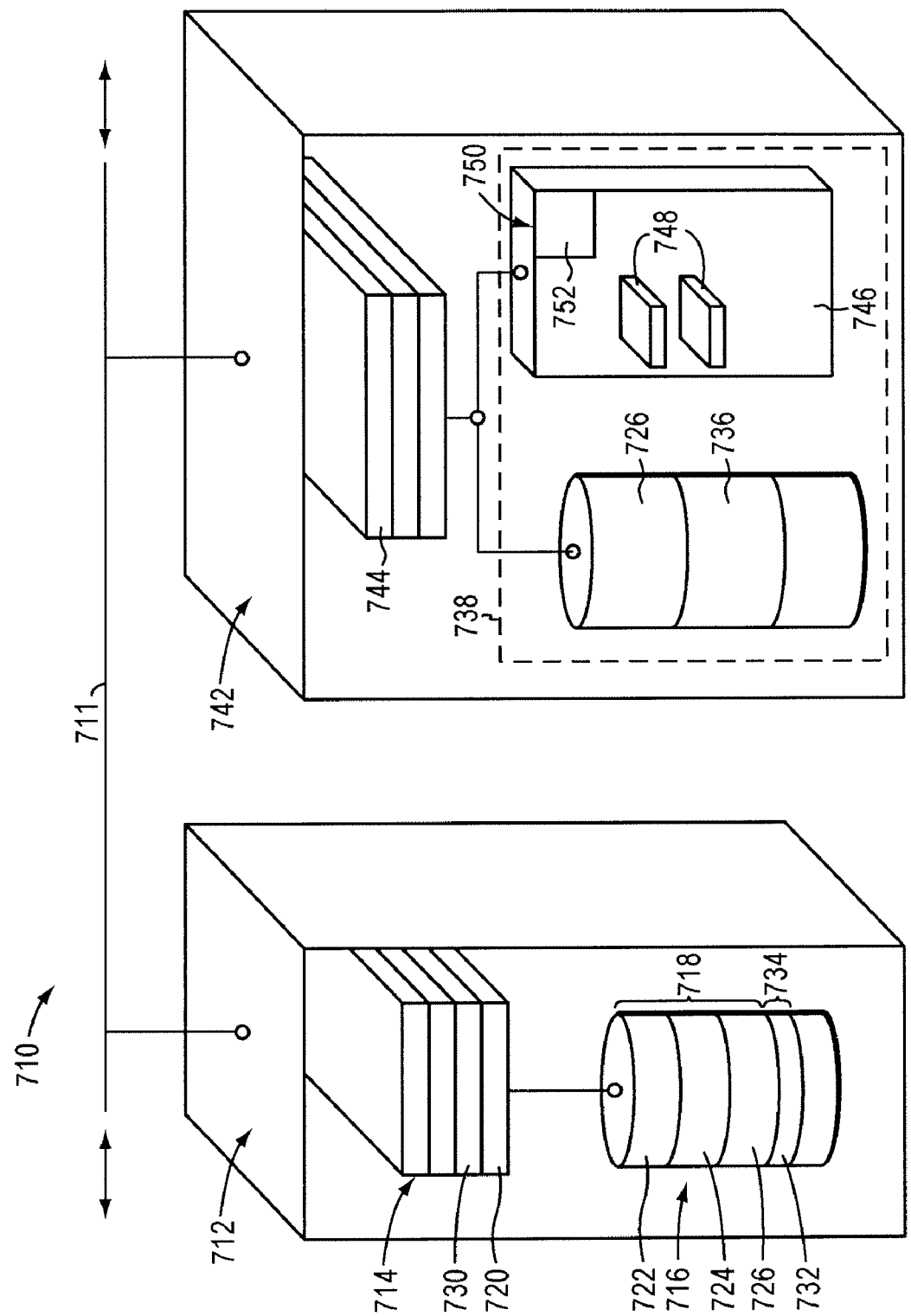

FIG. 7 illustrates a sample embodiment in which the data management technique may be provided. Data management system 710 has storage system 712 which includes an operating system 714 and a storage system memory 716, in which data units (e.g., files, blocks, or objects) with user data can be stored. The data units with the user data are thereby stored in a primary storage system 718 on the storage system memory 716.

To help prevent the number of data units in the primary storage system 718 from increasing excessively and to help keep the capacity of the storage system memory 716 at a useful level, the IPE 720 is associated with the primary storage system 718 and this divides the data units of the primary storage system 718 into, for example, three priority groups 722, 724 and 726, namely according to the rules for candidate data unit selection which act based on, for example, how long ago the respective data unit was last accessed. In accordance with the rules, other bases for acting can be block number, file name, user, access frequency, alone or in combination with one another.

For this purpose, a tracking system 730 associated with the operating system 714 records accessing of the data units in the primary storage system 718 and passes this to the IPE 720 so that this divides, for example, the primary storage system 718 into the priority group 722 with a highest ranking, e.g., with the most recent access, the priority group 724 with a lower ranking, e.g., with less recent access, and the priority group 726 with a lowest ranking, e.g., with the least recent access.

Since it is assumed in the case of the priority group 726 with the lowest ranking that it is unlikely that, for example, access to these data units by the operating system 714 will take place soon, primary metadata 732 are generated for these data units and filed in a metadata file system 734 on the storage system memory 716. In addition, the data units of the priority group 726 are stored in a secondary storage system 738 on a first storage medium 736 of another storage system 742. This other storage system 742 is, for example, likewise connected via a data link 711 to system 712 and comprises its own operating system 744, wherein a filing of data units in the first storage medium 736 or a second storage medium 746 can be organized with this operating system 744. Data link 711 may be, include, or be included in an I/O interface as described above (e.g., a network or channel).

The first storage medium 736 is preferably a fast data memory, e.g., a high performance hard disk or a semiconductor memory (e.g., flash memory or solid state disk) having comparable or better performance, and the second storage medium 746 is preferably a less expensive storage medium providing for inexpensive mass storage of data units. For example, the second storage medium 746 may include low performance hard disks 748, wherein these disks 748 are managed by a bulk storage system 750 and access to the low performance hard disks is brought about via read-write units 752.

Since primary metadata 732 have been generated from the data units of the priority group 726 and those data units have been transferred to the secondary data file system 738 of the storage system 742, a corresponding amount of storage system memory 716 can be freed up since the data units of the priority group 726 can be deleted from the primary storage system 718 and are now represented only by the primary metadata 732 stored on the storage system memory 716.

In at least one embodiment, the primary metadata 732 are managed under the same identifiers (e.g., data file names) as the individual data units of the priority group 726 and also include a reference to the secondary storage system 738, in which the data files of the priority group 726 are now filed.

In at least one embodiment, the metadata for one data unit includes all the relevant data for describing the data unit with the exception of the actual user data. The metadata also includes, for example, information about when the actual data unit was last accessed.

One implementation may operate as follows. When the operating system 714 attempts to access one of the data units of the priority group 726, the operating system 714 is interrupted and the IPE 720 finds in the metadata 732 corresponding to the respective data unit the reference to the data unit in the secondary storage system 738 in the storage system 742. With this reference, the requested data unit is copied by the IPE 720 from the secondary storage system 738 onto the primary storage system 718 again and can then be made available to the operating system 714 for access.

Another implementation may operate as follows. The IPE is only involved in the file selection and migrate phase in which objects are moved from primary to secondary storage. The read path used when an application performs a read request to a stub with file data in secondary storage is a separate path in the operating system managed by a file mover application which automates file movement between storage tiers.

In at least one embodiment, if the access attempt is for read access only, the requested data unit need not be copied onto the primary storage system 718 again; the access attempt may be satisfied from the secondary storage system 738 directly. However, in at least some cases, in accordance with the rules, it is also determined whether the read access attempt causes the data unit to become a member of a different priority group, e.g., a higher ranking group because it has now been accessed recently, in which case the data unit may need to be copied from the secondary storage system 738 onto the primary storage system 718 after the read access attempt has been satisfied.

In at least one embodiment, and depending on the rules which may govern how the data unit is to be treated, the access attempt may be satisfied from the secondary storage system 738 directly regardless of whether the access attempt is for read access or write access. For example, the rules may specify that access attempts pertaining to the data unit are to be satisfied from the secondary storage system 738 until a string of such attempts reaches a particular activity level. Again, however, at some point in at least some cases, in accordance with the rules, it may be determined that the data unit needs to be copied from the secondary storage system 738 onto the primary storage system 718 after the access attempt has been satisfied.

Since the data units of the priority group 726 are stored in the storage system 742 in the secondary storage system 738, it is also possible, for example, in the case of a second embodiment to provide, for reasons of redundancy, an additional secondary storage system 738' or even several secondary storage systems, in which the same data units are filed again, e.g., for security reasons, wherein the same metadata 732 can be used in order to be able to locate the data units in each of the secondary storage systems 738.

What is claimed is:

1. A method for use in managing data on data storage systems, the method comprising:
    defining first rules for candidate data unit selection, wherein the first rules are based on characteristics of data units, wherein the characteristics of the data units include age of each data unit, last access time for each data unit, size of each data unit, and file type of each data unit;
    automatically executing the first rules on a primary data storage system to examine the data units on the primary data storage system, wherein the first rules identify the data units for migration;

based on the first rules, dividing the data units on the primary data storage system into priority groups, wherein the priority groups are based on usage information of the data units;

identifying a priority group for migration;

migrating each data unit of the identified priority group from the primary storage system to a secondary storage system, wherein each data unit is migrated to the secondary storage system within the same storage domain;

creating an association between the primary storage system and the secondary storage system for maintaining a consistency group for the data units;

replacing each migrated data unit with metadata on the primary storage system, wherein the metadata has a same identifier as the migrated data unit the metadata is replacing and stores priority data associated with the migrated data unit the metadata is replacing;

freeing up data storage space in the primary storage system corresponding to each data unit of the identified priority group;

based on second rules, determining whether an access attempt for one of the migrated data units can be satisfied from the secondary storage system, wherein the second rules indicate how to access the one of the migrated data units based on the determination, completing the access attempt by accessing the one of the migrated data units from the secondary storage system;

determining whether the access attempt causes the one of the migrated data units to belong to a different priority group by changing usage information of the one of the migrated data units; and based on the determination, copying a subset of contents of the one of the migrated data units from the secondary storage system to the primary storage system after the access attempt has been satisfied from the secondary storage system.

2. The method of claim 1, wherein the primary data storage system has a first priority group containing data units that are frequently accessed and a second priority group containing data units that are seldom accessed, and the identified data unit belongs to the second priority group.

3. The method of claim 1, wherein the identified data unit is maintained in its original lookup space.

4. The method of claim 1, wherein the rules take into account the data unit's last access time.

5. The method of claim 1, wherein the data unit is copied to a respective location in the secondary storage system and the metadata points to the respective location.

6. The method of claim 1, wherein the data unit is moved to optimized storage within the same storage domain.

7. The method of claim 1, wherein a tight linkage is provided between the primary storage system and the secondary storage system to maintain a consistency group.

8. The method of claim 1, wherein the secondary storage system is storage that uses redundant data elimination (RDE).

9. The method of claim 1, wherein at least one of the primary and secondary storage systems uses semiconductor memory.

10. The method of claim 1, wherein at least one of the primary and secondary storage systems uses semiconductor memory exclusively.

11. The method of claim 1, wherein a data unit that is accessed frequently is stored in flash memory.

12. The method of claim 1, wherein a directory listing that includes the identified data unit has the same appearance to the user as a conventional directory listing.

13. The method of claim 1, further comprising:
processing data units on a project basis so that data units belonging to a file system and data storage associated with a particular project are moved to the secondary storage system automatically once the project period has completed.

14. The method of claim 1, wherein the namespace of a file system is unaffected so that on demand needs can be serviced without any manual intervention.

15. The method of claim 1, wherein the migration takes into account the type and size of the data unit.

16. The method of claim 1, wherein the identified data unit is migrated on a schedule.

17. The method of claim 1, further comprising:
invoking a driver when an access attempt is made to the identified data unit that has been moved to the secondary storage system, the driver causing at least some of the contents of the identified data unit to be retrieved from the secondary storage system to service the access attempt.

18. The method of claim 1, further comprising:
giving priority to reducing electrical power consumption by moving the identified data unit to a secondary storage system that uses little or no power when its data units are not being accessed.

* * * * *